(12) United States Patent
Hahn et al.

(10) Patent No.: US 12,083,895 B2
(45) Date of Patent: Sep. 10, 2024

(54) HYBRID DRIVE UNIT

(71) Applicant: MERCEDES-BENZ GROUP AG, Stuttgart (DE)

(72) Inventors: Peter Hahn, Stuttgart (DE); Carsten Gitt, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/039,005

(22) PCT Filed: Oct. 6, 2021

(86) PCT No.: PCT/EP2021/077569
§ 371 (c)(1),
(2) Date: May 26, 2023

(87) PCT Pub. No.: WO2022/111895
PCT Pub. Date: Jun. 2, 2022

(65) Prior Publication Data
US 2024/0100934 A1 Mar. 28, 2024

(30) Foreign Application Priority Data
Nov. 30, 2020 (DE) ..................... 10 2020 007 307.7

(51) Int. Cl.
*B60K 6/387* (2007.10)
*B60K 6/547* (2007.10)

(52) U.S. Cl.
CPC .............. *B60K 6/547* (2013.01); *B60K 6/387* (2013.01)

(58) Field of Classification Search
CPC ... F16H 3/093; F16H 2200/021; B60K 6/387; B60K 6/547
See application file for complete search history.

(56) References Cited

U.S. PATENT DOCUMENTS

| 5,799,536 A | 9/1998 | Janiszewski et al. |
| 9,003,907 B2 | 4/2015 | Weller et al. |

(Continued)

FOREIGN PATENT DOCUMENTS

| DE | 102012009484 B3 | 9/2013 |
| DE | 102013210013 A1 | 12/2014 |

(Continued)

OTHER PUBLICATIONS

International Search Report and Written Opinion mailed Dec. 23, 2021 in related/corresponding International Application No. PCT/EP2021/077569.

(Continued)

*Primary Examiner* — William C Joyce
(74) *Attorney, Agent, or Firm* — PATENT PORTFOLIO BUILDERS PLLC

(57) ABSTRACT

A hybrid drive unit includes an internal combustion engine, electric machine, and transmission having an input shaft and first and second countershafts. The internal combustion engine is directly couplable via a clutch to the input shaft. There are six shiftable gear pairings, each with a gearwheel arranged coaxially to the input shaft. The first gear pairing has a first gearwheel as an idler gear arranged coaxially to the input shaft and a second gearwheel as an idler gear arranged coaxially to the first countershaft. The electric machine is connected to the first gear pairing so that torques are directable into the transmission via the first gear pairing. When viewed in an axial direction, the first shiftable gear pairing, a first shifting element plane, the second shiftable gear pairing, the third shiftable gear pairing, the fourth shiftable gear pairing, a second shifting element plane, the fifth shiftable gear pairing, the sixth shiftable gear pairing, and an output gear plane are arranged one after the other in the specified sequence.

9 Claims, 2 Drawing Sheets

(56) References Cited

U.S. PATENT DOCUMENTS

Figure 1:
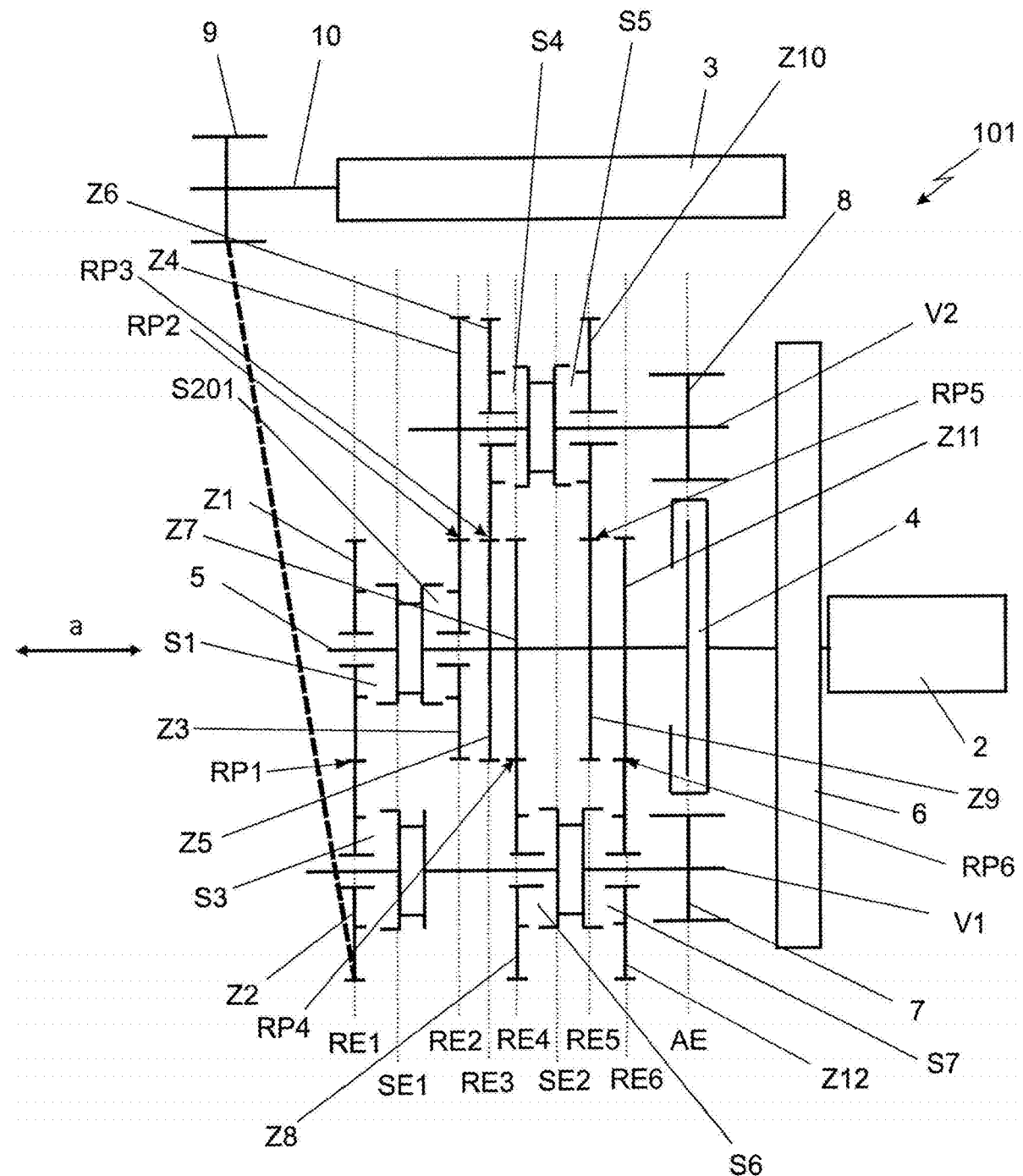

2005/0139035 A1* 6/2005 Lee .................... B60W 10/113
  74/661
2016/0089968 A1 3/2016 Lee et al.
2017/0305258 A1 10/2017 Liu et al.

FOREIGN PATENT DOCUMENTS

| DE | 102016013477 A1 | 5/2017 |
| DE | 102017112868 B3 | 9/2018 |
| EP | 2902236 A1 | 8/2015 |
| FR | 2859141 A1 | 3/2005 |
| JP | 2002031198 A | 1/2002 |
| JP | 2012188031 A | 10/2012 |
| JP | 2012201116 A | 10/2012 |
| JP | 2012240624 A | 12/2012 |
| JP | 2014054900 A | 3/2014 |
| JP | 201469727 A | 4/2014 |

OTHER PUBLICATIONS

Office Action created May 17, 2021 in related/corresponding DE Application No. 10 2020 007 307.7.
Notice of Reasons for Refusal dated May 28, 2024 in related/corresponding JP Application No. 2023-532584.

* cited by examiner

HYBRID DRIVE UNIT

BACKGROUND AND SUMMARY OF THE INVENTION

Exemplary embodiments of the invention relate to a hybrid drive unit, having an internal combustion engine, an electric machine, and a transmission.

Hybrid drive units are known, inter alia, from DE 10 2012 009 484 B3, FR 2 859 141 A1, DE 10 2017 112 868 B3, US 2017/0 305 258 A1, and DE 10 2016 013 477 A1.

Furthermore, DE 10 2013 210 013 A1, for example, describes such a hybrid drive unit in which the electric machine can be connected on the one hand to the input shaft of the transmission, but on the side, facing away from the internal combustion engine, of a clutch, which is more commonly referred to as a P2 connection, as well as to a countershaft, serving as an output shaft, which in turn is referred to as a P3 connection. The construction has four gear planes for four individual gears. The electric machine is connected to two idler gears on the input shaft, which in turn each form a gear pairing with a further idler gear on the countershaft. The electric machine can thus be appropriately coupled in the manner described above to the input shaft of the transmission or its countershaft or output shaft.

The structure is relatively large, especially in the axial direction, i.e., in the direction extending along the input shaft or along an axis of rotation of the input shaft of the transmission.

Exemplary embodiments of the present invention are directed to an improved hybrid drive unit, which in particular is very compact in the axial direction, and which is also able to shift gears when in the hybrid mode without a complete interruption of the tractive force.

In addition to the internal combustion engine, the hybrid drive unit comprises an electric machine and a transmission. The transmission comprises an input shaft and at least two countershafts. Six shiftable gear pairings are provided, each with a gearwheel arranged coaxially to the input shaft. A gear pairing in the context of the invention is to be understood as two engaging gearwheels, wherein one of the two is coaxial to the input shaft and the other of the two is arranged coaxially to one of the countershafts. The two gearwheels of the gear pairing are arranged in a gear plane perpendicular to the axis of rotation of the input shaft.

In the hybrid drive unit according to the invention, a first of the gear pairings comprises two idler gears—one on the input shaft and one on the first countershaft. The electric machine is connected to this first gear pairing in such a way that torques proceeding from the electric machine can be directed into the transmission via the first gear pairing. As a result of the design of the first gear pairing via two idler gears, both a P2 connection and a P3 connection are possible.

Furthermore, seen in an axial direction, which is here always considered in relation to the axis of rotation of the input shaft, the first shiftable gear pairing, a first shifting element plane, the second shiftable gear pairing, the third shiftable gear pairing, the fourth shiftable gear pairing, a second shifting element plane, the fifth shiftable gear pairing, the sixth shiftable gear pairing, and an output gear plane are arranged in succession in the specified sequence.

In this case, a shifting element is to be understood as a device provided for a torque-proof connection of an idler gear of a gear pairing to the shaft on which it is mounted, wherein the shifting element comprises at least one sliding sleeve and a dog clutch toothing, and, in an advantageous embodiment, further comprises a synchronizing device. Two adjacent and coaxially-arranged shifting elements can advantageously share one and the same sliding sleeve. In this case, a shifting element plane is a plane arranged perpendicular to the axis of rotation of the input shaft and intersecting at least two shifting elements, wherein the at least two shifting elements are arranged coaxially to different shafts, wherein the shafts are understood to mean the input shaft, the first countershaft, and the second countershaft.

The expression that a shifting element plane "comprises" a shifting element means that this shifting element plane intersects at least a part of this shifting element. Similarly, an output gear plane is a plane arranged perpendicular to the axis of rotation of the input shaft and which comprises the output gears arranged in a torque-proof manner on the countershaft.

In the context of the invention, torque-proof means that the accordingly connected elements arranged coaxially to one another rotate at the same angular velocity or rotational speed.

An idler gear, or the expression, "idler gear on a shaft," is understood to mean a gearwheel arranged coaxially and is able to rotate with respect to this shaft. An idler gear can generally be connected to this shaft in a torque-proof manner by means of a shifting element. A fixed gear, or the expression, "fixed gearwheel on a shaft," is to be understood in the following as a gearwheel arranged coaxially to the shaft and is permanently connected to this shaft in a torque-proof manner.

The hybrid drive unit according to the invention can thus achieve a very compact design—especially in the axial direction. Due to the special gearset architecture, this is possible at very low cost. In addition, despite the simple design, the shifting allows for full functionality and a high degree of comfort. In particular, the gears can be shifted without interruption of the tractive force.

According to an exceptionally favorable refinement of the invention, the first gear pairing is arranged in the last gear plane, as seen along the input shaft from the position of the clutch.

According to a very advantageous refinement of the invention, the electric machine also overlaps the clutch in the axial direction. The overlapping arrangement in the context of the invention means that the elements mentioned are intersected by the same axial plane, or project in the axial direction into the same axial plane. The elements mentioned thus overlap at least partially in the axial direction. An axial plane is understood to mean a plane perpendicular to the axis of rotation of the input shaft.

The hybrid drive unit according to the invention can preferably dispense with a clutch capable of the starting the engine, and in particular also a mechanical reverse gear. As a result, the diameter of the clutch can be made accordingly low, so that it can be arranged in a space-saving manner with an overlap with the electric machine, and, according to an extraordinarily favorable refinement, it can be arranged also so as to overlap at least two output gears on the at least two countershafts.

This variant, and, here, in particular the combination of the two last-mentioned embodiments, ensures an even more compact design.

In a hybrid vehicle having the hybrid drive unit according to the invention, it is then possible for this to be employed together with a further, purely electrically-driven, axle, to drive an axle driven via the hybrid drive unit. Starting processes, and reverse travel, can then be implemented purely electrically with one or both electric machines, i.e., the hybrid drive unit according to the invention and the further, purely electrically-driven, axle. The shifting inside the transmission can take place, for the case of drive via the internal combustion engine or the internal combustion engine and the electric machine, without load interruption. This is achieved by the electric machine, during the shifting in the P3 connection, accordingly compensating for or supporting the rotational speeds and torques.

The special gear set architecture of the hybrid drive unit according to the invention can further provide that the first gear pairing comprise a first gearwheel arranged coaxially to the input shaft and a second gearwheel arranged coaxially to the first countershaft, the second gear pairing comprise a third gearwheel arranged coaxially to the input shaft and a fourth gearwheel arranged coaxially to the second countershaft, the third gear pairing comprise a fifth gearwheel arranged coaxially to the input shaft and a sixth gearwheel arranged coaxially to the second countershaft, the fourth gear pairing comprise a seventh gearwheel arranged coaxially to the input shaft and an eighth gearwheel arranged coaxially to the first countershaft, the fifth gear pairing comprise a ninth gearwheel arranged coaxially to the input shaft and a tenth gearwheel arranged coaxially to the second countershaft, and the sixth gear pairing comprise an eleventh gearwheel arranged coaxially to the input shaft and a twelfth gearwheel arranged coaxially to the first countershaft.

This arrangement contributes to the above-mentioned advantages—in particular, if it is additionally provided according to a further very favorable embodiment of the invention that the first shifting element plane comprise at least one third shifting element arranged coaxially to the first countershaft and a first shifting element arranged coaxially to the input shaft, and that the second shifting element plane comprise at least one fifth shifting element arranged coaxially to the second countershaft and a sixth shifting element arranged coaxially to the first countershaft.

As a further advantageous enhancement of this embodiment, it can also be provided that the first shifting element be provided for the torque-proof connection of the first gearwheel to the input shaft, the third shifting element be provided for the torque-proof connection of the second gearwheel to the first countershaft, the fourth shifting element be provided for the torque-proof connection of the sixth gearwheel to the second countershaft, the fifth shifting element be provided for the torque-proof connection of the tenth gearwheel to the second countershaft, the sixth shifting element be provided for the torque-proof connection of the eighth gearwheel to the first countershaft, and the seventh shifting element be provided for the torque-proof connection of the twelfth gearwheel to the second countershaft.

In this case, the fourth shifting element and the fifth shifting element as well as the sixth shifting element and the seventh shifting element can preferably each be designed as shifting elements with a shared sliding sleeve. The transmission is accordingly even more favorable and more compact in its construction.

In addition, a very favorable embodiment of the hybrid drive unit according to the invention can provide that the first gear pairing, the second gear pairing, the third gear pairing, and the sixth gear pairing each form an associated pure gear plane. In this case, a pure gear plane is understood to mean a plane which is perpendicular to the axis of rotation of the input shaft and intersects only one gear pairing, but not a shifting element. This also contributes to the compact design.

Further advantageous embodiments and refinements of the hybrid drive unit according to the invention also result from the exemplary embodiments, which are illustrated in more detail below with reference to the figures.

BRIEF DESCRIPTION OF THE DRAWING FIGURES

Figure 2:
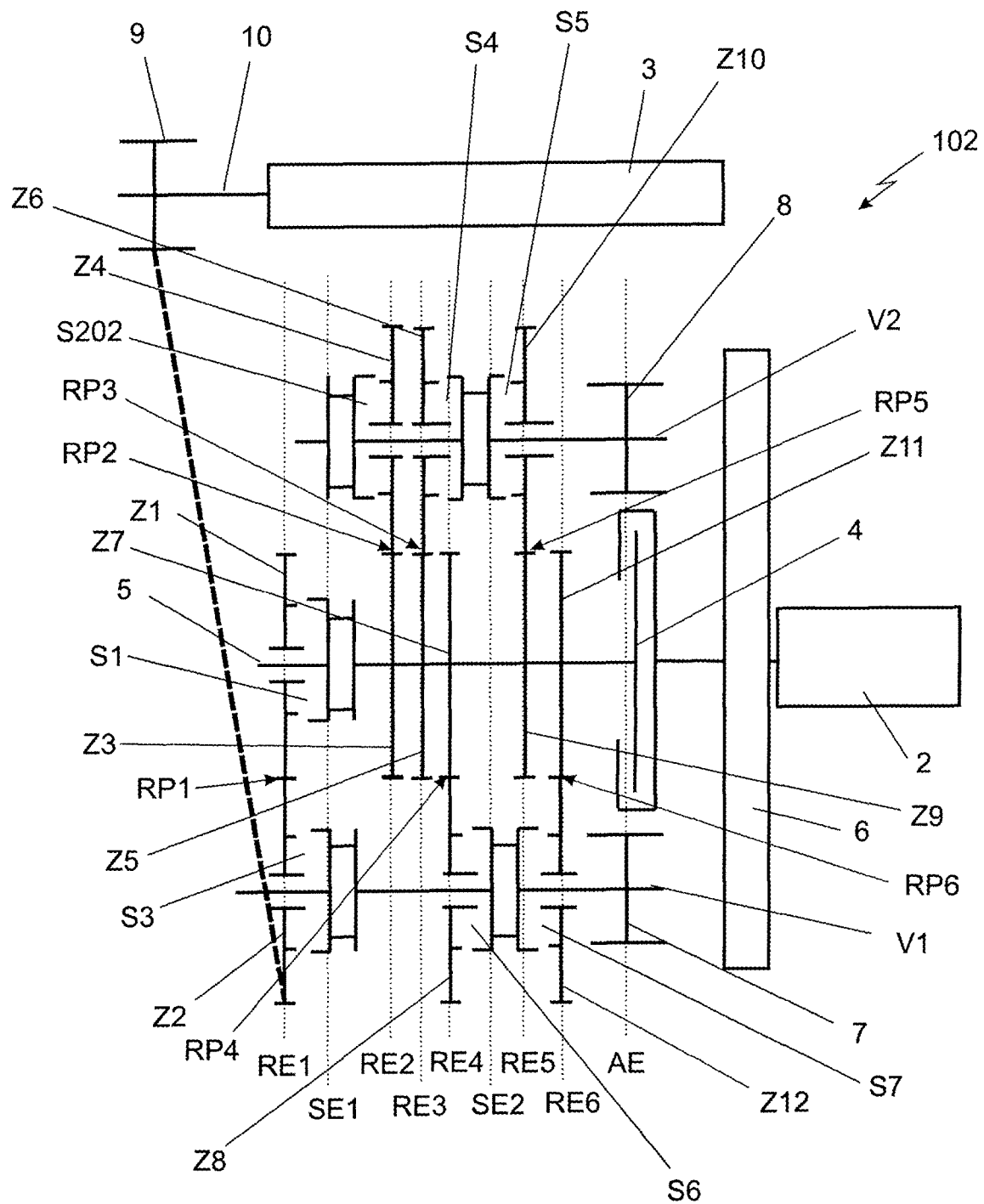

In the drawings:

FIG. 1 shows a first possible variant of the hybrid drive unit according to the invention; and FIG. 2 shows a second possible variant of the hybrid drive unit according to the invention.

DETAILED DESCRIPTION

In the two figures, a hybrid drive unit 101, 102 is shown schematically in a possible design according to the invention. The gear set plans, which serve to illustrate the transmission installed therein, are not to be understood as true to scale, nor do all components necessarily lie in the plane of the drawing in which they are shown. The illustrated orders of magnitude of the components relative to one another do not have to correspond to the real structure.

FIG. 1 shows a first variant of the hybrid drive unit 101, which comprises an internal combustion engine 2 and an electric machine 3. The internal combustion engine 2 is connected directly via a clutch 4 to an input shaft 5 of a transmission of the hybrid drive unit 101. The direct connection can optionally comprise a device 6 for suppressing and/or damping rotary oscillations, e.g., a dual mass flywheel, between a crankshaft of the internal combustion engine 2 and the clutch 4, so that "directly" is to be understood in this case as meaning that no further transmission elements such as clutches, transmissions, or the like are arranged between the crankshaft of the internal combustion engine 2 and the clutch 4.

In the axial direction a of the axis of rotation of the input shaft 5, six gear pairings follow, as seen from the clutch 4: a first gear pairing RP1, a second gear pairing RP2, a third gear pairing RP3, a fourth gear pairing RP4, a fifth gear pairing RP5, and a sixth gear pairing RP6, each in an associated gear plane, viz., a first gear plane RE1 up to a sixth gear plane RE6. Of the six gearwheels each arranged coaxially to the input shaft 5—specifically, an eleventh gearwheel Z11 assigned to the sixth gear pairing RP6, a ninth gearwheel Z9 assigned to the fifth gear pairing RP5, a seventh gearwheel Z7 assigned to the fourth gear pairing RP4, a fifth gearwheel Z5 assigned to the third gear pairing RP3, a third gearwheel Z3 assigned to the second gear pairing RP2, and a first gearwheel Z1 assigned to the first gear pairing RP1—the first four gearwheels Z11, Z9, Z7, and Z5 as seen from the direction of the clutch 4 are each designed as idler gears on the input shaft 5, whereas the two last gearwheels Z3 and Z1 are designed as idler gears. By means of two shifting elements, viz., a first shifting element S1 for the first gearwheel Z1 and a second shifting element S201 for the third gearwheel Z3, the first gearwheel Z1 and the third gearwheel Z3 can each be connected to the input shaft 5 in a torque-proof manner. The two shifting elements S1, S201 are arranged and combined in such a way that they function with a shared sliding sleeve.

Two countershafts, viz., a first countershaft V1 and a second countershaft V2, are each arranged parallel to the input shaft 5. A first output gear 7 is arranged coaxially to the first countershaft V1, and is connected to it in a torque-proof manner. A second output gear 8 is arranged coaxially to the second countershaft V2, and is connected to it in a torque-proof manner. The output gears 7, 8 advantageously mesh, without further interposed transmission elements, with a differential gear (not shown here) (i.e., an input gearwheel of a differential gear). In this case, the output gears 7, 8 are advantageously arranged in the same output gear plane AE with the clutch 4. The output gear plane AE is arranged perpendicular to the axial direction a and intersects both the two output gears 7, 8 and the clutch 4.

In this case, the first gear pairing RP1 is the last gear pairing RP1 as seen in the axial direction a from the clutch 4, and thus is arranged in the last gear plane RE1, seen in this direction. It comprises the first gearwheel Z1, which is designed as an idler gear on the input shaft 5, and a second gearwheel Z2, which is likewise designed as an idler gear and is arranged coaxially to the first countershaft V1. As already mentioned, the first gearwheel Z1 can be connected to the input shaft 5 in a torque-proof manner via the first shifting element S1, and the second gearwheel Z2 can be connected to the first countershaft V1 in a torque-proof manner via a third shifting element S3. The electric machine 3 is then connected via a pinion 9, which is connected to a rotor shaft 10 of the electric machine 3 in a torque-proof manner, in the first gear pairing RP1. For this purpose, the pinion 9 meshes with the second gearwheel Z2 of the first gear pairing RP1, as indicated in the illustration of FIG. 1 by the dashed line. Alternatively—and not shown—the pinion 9 can also mesh with the first gearwheel Z1. An intermediate gear or an intermediate shaft is, advantageously, arranged between the pinion 9 and the respective idler gear.

As such, torque can be directed from the electric machine 3 into the transmission. Depending upon the position of the shifting elements S1, S3, a so-called P2 connection can be implemented, in which the electric machine 3 acts upon the input shaft 5—specifically, upon the side, opposite the internal combustion engine 2, of the clutch 4—via the pinion 9 and the idler gear Z2, rotating freely on the first countershaft V1, of the first gear pairing RP1 and the first gearwheel Z1 that is then coupled to the input shaft 5 via the first shifting element S1 in a torque-proof manner. Depending upon the shifting position within the transmission, the output then takes place via the first countershaft V1 and its output gear 7 or the second countershaft V2 and its output gear 8.

As an alternative to this, the structure can be switched to a so-called P3 connection of the electric machine 3, in which, when the shifting element S1 is open—and accordingly, the idler gear Z1 is rotating on the input shaft 5, and the second gearwheel Z2 of the first gear pairing PR1 is then coupled in a torque-proof manner to the first countershaft V1 via the third shifting element S3—the first countershaft V1, and therefore its output gear 7, is driven directly by the electric machine 3.

Because the transmission is shifted into neutral (no idler gear is coupled), the electric machine 3 can start the internal combustion engine 2, for example, or the internal combustion engine 2 drives the electric machine 3 as a generator.

In this case, the electric machine 3 is arranged so as to overlap the clutch 4 in the axial direction a, and thus in particular also the output gears 7, 8 of the countershaft V1, V2. As a result of the connection of the electric machine 3 to the last gear plane RE1 in the axial direction a as seen from the clutch 4, and its simultaneous axial overlap with the clutch 4, i.e., a projection into the shared output gear plane AE of the clutch 4, and in particular of the output gears 7, 8, an extraordinarily compact design is ensured.

In the axial direction a—this time as seen from the gear plane RE1 with the gear pairing RP1 in the direction of the clutch 4—the first gear pairing RP1 is followed by the second gear pairing RP2 with the third gearwheel Z3, which is likewise designed as an idler gear on the input shaft 5. The latter is shiftable via the second shifting element S201 in a manner comparable to the first gearwheel Z1, wherein, advantageously, the shifting elements S1 and S201 can be designed with a shared sliding sleeve so that a type of double shifting element is produced, which saves upon installation space and in particular costs. A fourth gearwheel Z4, which is designed as a fixed gearwheel on the second countershaft V2, serves as a further gearwheel of the second gear pairing RP2. In the illustration of FIG. 1, on the right next to this second gear pairing RP2, the third gear pairing RP3 follows, in which the fifth gearwheel Z5 is designed as a fixed gearwheel on the input shaft 5, and the sixth gearwheel Z6 is designed as an idler gear on the second countershaft V2. In addition, the fourth gear pairing RP4 is arranged in the fourth gear plane RE4. The seventh gearwheel Z7 is designed as a fixed gearwheel on the input shaft 5, and the eighth gearwheel Z8 of this fourth gear pairing RP4 is designed as an idler gear—this time on the first countershaft V1.

The fifth gear pairing RP5 is then formed in the fifth gear plane RE5. It is in turn formed with an idler gear—the tenth gearwheel Z10—on the countershaft 2, and a fixed gear—the ninth gearwheel Z9—on the input shaft 5. Because the fourth gear plane RE4 has its eighth gearwheel Z8, serving as an output gear, on the first countershaft V1, sufficient space now arises on the second countershaft V2, so that a fourth shifting element S4 for the sixth gearwheel Z6 of the third gear pairing RP3 and a fifth shifting element S5 for the tenth gearwheel Z10, i.e., the output gear of the fifth gear pairing RP5, can be placed next to one another in such a way that these two shifting elements S4, S5 can also be implemented with a shared sliding sleeve as a dual shifting element. The sixth gear pairing RP6 in the sixth gear plane RE6 is in turn arranged with a fixed gear—the eleventh gearwheel Z11—on the input shaft 5 and an idler gear—the twelfth gearwheel Z12—on the first countershaft V1. The associated shifting element—a seventh shifting element S7—can then be positioned next to a sixth shifting element S6 for the fourth gear pairing RP4 in such a way that it also lies in the installation space created by the fifth gear pairing RP5, which outputs towards the second countershaft V2. Here too, the two shifting elements S6, S7 can then be formed with a shared sliding sleeve in the manner of a dual shifting element. This sixth gear plane RE6 is then followed by the output gear plane AE already mentioned above, in which at least the two output gears 7, 8 of the countershafts V1, V2 are located, and in which, in this case, the clutch 4 is also accordingly arranged. The electric machine 3 also overlaps this output gear plane AE in the axial direction a.

A first shifting element plane SE1 with the third shifting element S3 arranged coaxially to the first countershaft V1 and the first shifting element S1 arranged coaxially to the input shaft 5 then lies between the first gear plane RE1 and the second gear plane RE2. A second shifting element plane SE2 lies between the fourth gear plane RE4 and the fifth gear plane RE5 and comprises the fifth shifting element S5 and the sixth shifting element S6, while the fourth shifting element S4 and the seventh shifting element S7 are arranged in the fourth gear plane RE4 and the fifth gear plane RE5, respectively.

The term, "shifting element plane," means a plane that is arranged perpendicular to the axial direction a and intersects the shifting elements belonging to it or "comprised" by it.

The transmission of the hybrid drive unit 101 can advantageously be designed in such a way that it is used as a six-gear transmission without a mechanical reverse gear. In particular, reverse travel therefore takes place via the electric machine 3. The same can also be used for starting the vehicle, in order to make do with an accordingly small clutch 4, which in this case does not have to be capable of starting the engine. It can then be designed small enough that, as indicated in the illustration of FIG. 1, it lies, together with the output gears 7, 8 of the countershaft V1, V2, in the output gear plane AE.

In this case, the gear ratios can be designed in such a way that a first or a second gear of the transmission is represented alternately via the fourth gear pairing RP4 and via the fifth gear pairing RP5. The first gear pairing RP1 is then used to implement a third gear, and the third gear pairing RP3 and the sixth gear pairing RP6 can be used to implement gears four, five, or six, wherein the second gear pairing RP2 is additionally used accordingly for implementing the fifth or sixth gear.

The term, "gear," or the term, "gears," means adjustable gear ratios in which a gear ratio continually decreases in the series from the first gear to the sixth gear.

A specific example of this described embodiment could therefore provide that the first gear be implemented by the fifth gear pairing RP5, the second gear by the fourth gear pairing RP4, the third gear by the first gear pairing RP1, the fourth gear by the sixth gear pairing RP6, the fifth gear by the third gear pairing RP3, and the sixth gear by the second gear pairing RP2.

Alternatively, with the design of the hybrid drive unit 101 in the embodiment according to FIG. 1, the fourth gear can be implemented with the first gear plane RE1, the second or sixth gear can be alternately implemented with the second gear plane RE2, and the first, second, or third gear can accordingly alternately be implemented with the fourth gear plane RE4, as well as with the fifth gear plane RE5. The remaining gears can then be implemented alternately with the third and the sixth gear planes RE3, RE6. A specific exemplary embodiment in this case could be designed in particular in such a way that the first gear is implemented via the fifth gear pairing RP5, the second gear via the fourth gear pairing RP4, the third gear via the third gear pairing RP3, and the fourth gear via the first gear pairing RP1. The fifth gear could then be implemented via the sixth gear pairing RP6 and the sixth gear accordingly via the second gear pairing RP2.

FIG. 2 shows an alternative variant of the hybrid drive unit 102. The difference is that the second shifting element S201 changes from the input shaft 5 to the second countershaft V2. The second gear pairing RP2 now thus also has as the third gearwheel Z3 a fixed gearwheel on the input shaft 5, like the gear pairings RP3 through RP6. The fourth gearwheel Z4 is now an idler gear on the second countershaft V2, which, via a second shifting element 202, can be selectively released or connected to the second countershaft V2 in a torque-proof manner. In this embodiment of the hybrid drive unit 102, this second shifting element S202, which has now "migrated" to the second countershaft V2, migrates into the first shifting element plane SE1, in addition to the first shifting element S1 and the third shifting element S3, such that the construction is even more compact. The rest of the construction of the hybrid drive unit 102 is analogous to the already described structure of the hybrid drive unit 101 of the preceding figure.

In this case, it can be provided that the fourth and the fifth gear planes RE4, RE5 be used alternately for the first and second gears, the first gear plane RE1 be used for the third gear, the second gear plane RE2 be used for gears two or four, and the third gear plane RE3, as well as the sixth gear plane RE6, be used alternately for gears 4, 5, or 6. For this constellation, a specific example could be that the first gear is implemented via the fifth gear pairing RP5, the second gear via the fourth gear pairing RP4, the third gear via the first gear pairing RP1, the fourth gear via the second gear pairing RP2, the fifth gear via the third gear pairing RP3, and the sixth gear via the sixth gear pairing RP6.

In a further variant of the hybrid drive unit 102, it could also be provided that gears 1, 2, and/or 3 be alternately implemented via the fourth gear plane RE4 and the fifth gear plane RE5, and gears 3 or 5 then alternately via the second gear plane RE2, and the fourth gear via the first gear plane RE1. The remaining gears could then be implemented alternately via the third and the sixth gear planes RE3, RE6. In this case, a concrete exemplary embodiment could again be that the first gear is implemented via the gear plane RE5, i.e., the fifth gear pairing RP5, the second gear via the fourth gear pairing RP4, the third gear via the third gear pairing RP3, the fourth gear via the first gear pairing RP1, the fifth gear via the second gear pairing RP2, and the sixth gear via the sixth gear pairing RP6.

All variants of the hybrid drive unit 101, 102 according to FIGS. 1 and 2 allow six gears to be implemented without a mechanical reverse gear. The hybrid drive unit 101, 102 can preferably be used for driving a first driven axle of a vehicle in which a second driven axle is driven purely electrically. The vehicle could then in principle have further driven or non-driven axles, wherein the construction as a passenger car typically provides for two axles. Such a hybrid vehicle is the preferred, but not exclusive, intended use of the hybrid drive unit 101, 102.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A hybrid drive unit, comprising:
   an internal combustion engine;
   an electric machine; and
   a transmission with an input shaft, at least one first countershaft, and at least one second countershaft;
   a clutch via which the internal combustion engine directly couplable to the input shaft,
   wherein there are six shiftable gear pairings, which include a first gear pairing, a second gear pairing, a third gear pairing, a fourth gear pairing, a fifth gear pairing, and a sixth gear pairing, each of the six shiftable gear pairings having a gearwheel arranged coaxially to the input shaft, wherein the first gear pairing has a first gearwheel configured as an idler gear and arranged coaxially to the input shaft, wherein, when viewed in an axial direction of the hybrid drive unit, the first shiftable gear pairing, a first shifting element plane, the second shiftable gear pairing, the third shiftable gear pairing, the fourth shiftable gear pairing, a second shifting element plane, the fifth shiftable gear pairing, the sixth shiftable gear pairing, and an output gear plane are arranged one after the other in the specified sequence, wherein the first gear pairing comprises a second gearwheel configured as an idler gear and arranged coaxially to the first countershaft, wherein the electric machine is connected to the first gear pairing in such a way that torques, starting from the electric machine, are directable into the transmission via the first gear pairing, wherein the second gear pairing comprises a third gearwheel arranged coaxially to the input shaft and a fourth gearwheel arranged coaxially to the second countershaft, wherein the third gear pairing comprises a fifth gearwheel arranged coaxially to the input shaft and a sixth gearwheel arranged coaxially to the second countershaft, wherein the fourth gear pairing comprises a seventh gearwheel arranged coaxially to the input shaft and an eighth gearwheel arranged coaxially to the first countershaft, wherein the fifth gear pairing comprises a ninth gearwheel arranged coaxially to the input shaft and a tenth gearwheel arranged coaxially to the second countershaft, and wherein the sixth gear pairing comprises an eleventh gearwheel arranged coaxially to the input shaft and a twelfth gearwheel arranged coaxially to the first countershaft.

2. The hybrid drive unit of claim 1, wherein the first gear pairing is arranged, as viewed from the clutch, in a last gear plane in the axial direction.

3. The hybrid drive unit of claim 1, wherein the electric machine is arranged axially overlapping the clutch.

4. The hybrid drive unit of claim 1, wherein
the first shifting element plane comprises at least one second shifting element arranged coaxially to the first countershaft and a first shifting element arranged coaxially to the input shaft, and wherein the second shifting element plane comprises at least one third shifting element arranged coaxially to the second countershaft and a fourth shifting element arranged coaxially to the first countershaft.

5. The hybrid drive unit of claim 4, wherein
the first shifting element is arranged to provide a torque-proof connection of the first gearwheel to the input shaft, the second shifting element is arranged to provide a torque-proof connection of the second gearwheel to the first countershaft, a fifth shifting element is arranged to provide a torque-proof connection of the sixth gearwheel to the second countershaft, the third shifting element arranged to provide a torque-proof connection of the tenth gearwheel to the second countershaft, the fourth shifting element is arranged to provide a torque-proof connection of the eighth gearwheel to the first countershaft, and a sixth shifting element is arranged to provide a torque-proof connection of the twelfth gearwheel to the first countershaft.

6. The hybrid drive unit of claim 5, wherein the fifth shifting element and the third shifting element are configured as the first shifting element with a shared sliding sleeve, and wherein the fourth shifting element and the sixth shifting element are configured as a seventh shifting element with a shared sliding sleeve.

7. The hybrid drive unit of claim 1, wherein the first gear pairing, the second gear pairing, the third gear pairing, and the sixth gear pairing each form an associated pure gear plane.

8. The hybrid drive unit of claim 1, wherein the clutch is configured so that the clutch is not able to start the engine.

9. The hybrid drive unit of claim 1, wherein the clutch is arranged axially overlapping at least two output gears on the at least two countershafts.

* * * * *